Patented June 19, 1928.

1,673,803

UNITED STATES PATENT OFFICE.

ELMER ANSON DANIELS, OF BERWYN, AND HARRY STIRLING SNELL, OF CHICAGO, ILLINOIS, ASSIGNORS TO WESTERN ELECTRIC COMPANY, INCORPORATED, OF NEW YORK, N. Y., A CORPORATION OF NEW YORK.

HARDENING RESINOUS EXUDATIONS WITH A GUANIDINE.

No Drawing.     Application filed August 21, 1924. Serial No. 733,442.

This invention relates to improved compositions of matter and methods of producing them.

Objects of the invention are to produce an improved composition of matter having a resinous exudate as its base and to provide a method for producing the improved compositions.

According to the main features of the invention a relatively small amount of a guanidine is added to a resinous exudation, preferably shellac, and mixed therewith in a suitable manner. When the mixing has been completed heat is applied thereto and a chemical reaction occurs between the guanidine and the shellac which produces a hard substance resistant to the ordinary solvents and remaining relatively hard at temperatures considerably above the temperature at which the resinous exudation begins to soften. The best results are obtained by employing diphenylguanidine or triphenylguanidine. Of these two the latter, triphenylguanidine, seems to produce the greatest hardening action, the exact chemical nature of the reaction occurring, however, being unknown.

Hardened shellac such as that which constitutes one embodiment of the present invention is of very great value in the production of improved molding compounds. An example of molding composition in which hardened shellac is incorporated is, as follows: The shellac is dissolved in a suitable solvent, for example alcohol, the hardener in suitable amounts added thereto, and the entire mixture incorporated with wood flour, the amount of wood flour used depending upon the properties desired in the finished product. A suitable mixture comprising these ingredients which when completed may be employed as a substitute for wood or other materials may have the following proportions; shellac, 50 pounds; denatured alcohol, 15 gallons; triphenylguanidine, 0.5 pounds; and wood flour 300 pounds. After all of the ingredients have been incorporated in the mixture it is agitated until there is a thorough dispersion of all of the ingredients throughout the mass. The mixture is then spread out and thoroughly dried to insure the removal of the last trace of alcohol, after which it is found to be in the form of a dry powder. This powder can then be molded by means of heat and pressure into whatever shape is desired.

The powder can be molded in a number of ways but good results are obtained by proceeding in the following manner: The powder is placed in a suitable mold and subjected to about 2000 pounds pressure per square inch for about ten minutes at a temperature of from 260° F. to 270° F. The source of heat is then removed and the composition allowed to cool, while still under pressure, to a temperature sufficiently low to allow the pieces to be handled.

An article produced in this manner is resistant to alcohol and remains hard at temperatures considerably above the temperature at which natural shellac begins to soften. The relative amounts of the ingredients may be varied for the purpose of changing the character of the resulting compound, and the temperature, time and pressure of molding may also be varied without impairing the product. Instead of wood flour, other types of fillers may be employed, such as marble dust, asbestos flour, infusorial earth and the like.

Shellac hardened in the manner herein described may be used as the binder for an improved cork composition such as that described in our co-pending application, Serial No. 724,950 filed July 9, 1924.

What is claimed is:

1. A composition of matter formed by condensation of a resinous exudation and a guanidine.

2. A composition of matter formed by the condensation of a resinous exudation with triphenylguanidine.

3. A composition of matter formed by the condensation of shellac and a guanidine.

4. A composition of matter formed by the condensation of shellac and triphenylguanidine.

5. A method of hardening resinous exudations, which consists in adding thereto a guanidine and heating.

6. A method of hardening a resinous exudation, which consists in adding thereto a guanidine and subjecting the resulting mixture to heat and pressure.

7. A method of hardening a resinous exudation, which consists in adding triphenylguanidine thereto and heating.

8. A method of hardening a resinous exudation, which consists in adding triphenylguanidine thereto and then subjecting the resulting mixture to heat and pressure.

9. A method of hardening shellac, which consists in adding thereto a guanidine, and heating.

10. A method of hardening shellac, which consists in adding thereto a guanidine and then subjecting the resulting mixture to heat and pressure.

11. A method of hardening shellac, which consists in adding triphenylguanidine thereto, and then heating.

12. A method of hardening shellac, which consists in adding triphenylguanidine thereto, and then subjecting the resulting mixture to heat and pressure.

In witness whereof, we subscribe our names this 16 day of August A. D., 1924.

ELMER ANSON DANIELS.
HARRY STIRLING SNELL.